No. 739,097. PATENTED SEPT. 15, 1903.
F. M. MARCY.
HOSE OR TUBING.
APPLICATION FILED FEB. 5, 1903.
NO MODEL.
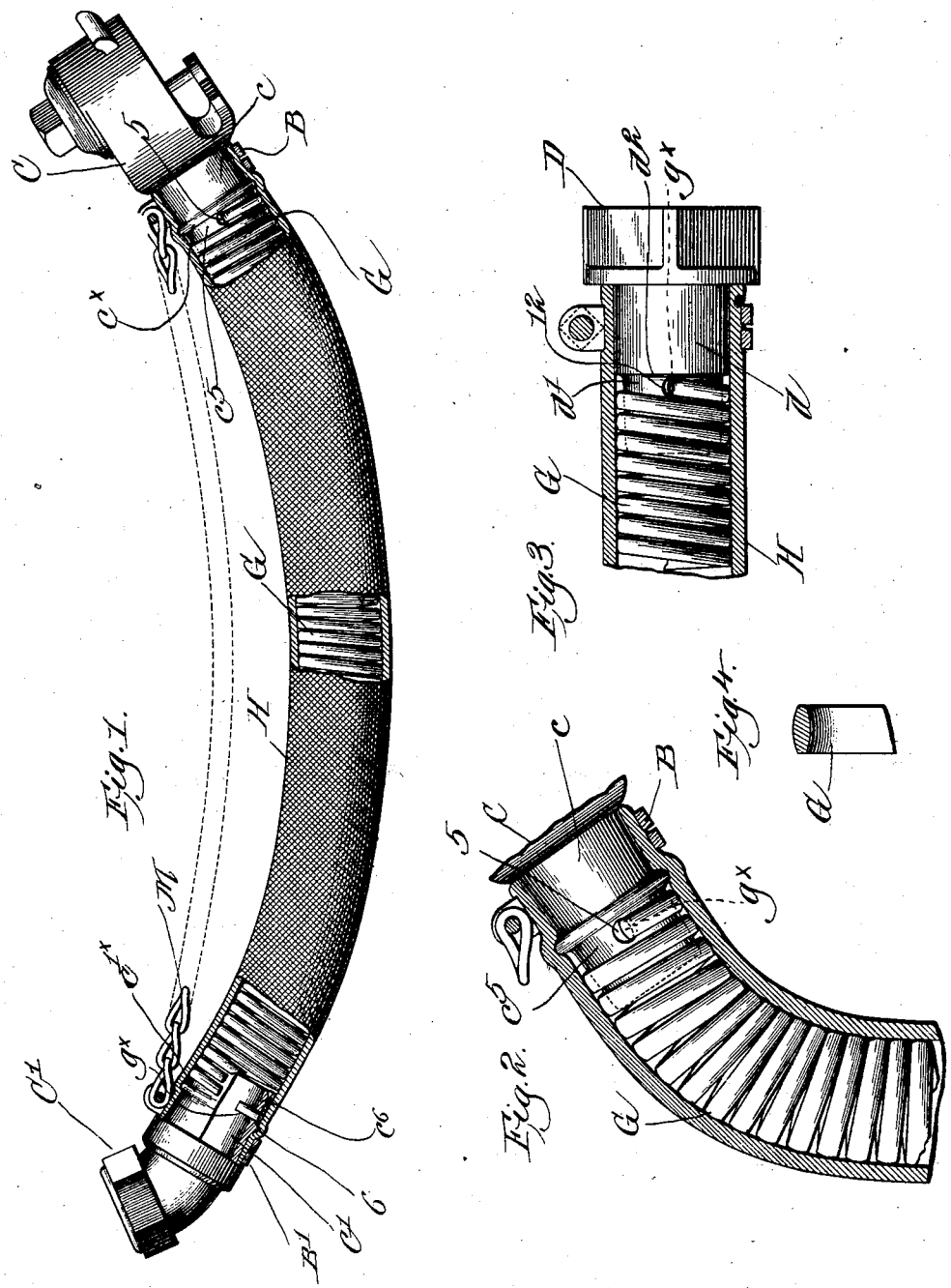

No. 739,097.  
Patented September 15, 1903.

UNITED STATES PATENT OFFICE.

FRANK M. MARCY, OF WORCESTER, MASSACHUSETTS, ASSIGNOR OF ONE-HALF TO GEORGE OTIS DRAPER, OF HOPEDALE, MASSACHUSETTS.

HOSE OR TUBING.

SPECIFICATION forming part of Letters Patent No. 739,097, dated September 15, 1903.

Application filed February 5, 1903. Serial No. 141,953. (No model.)

*To all whom it may concern:*

Be it known that I, FRANK M. MARCY, a citizen of the United States, and a resident of Worcester, county of Worcester, State of Massachusetts, have invented an Improvement in Hose or Tubing, of which the following description, in connection with the accompanying drawings, is a specification, like characters on the drawings representing like parts.

This invention relates to flexible hose or tubing; and it has for its object the production of novel, simple, and effective means for preventing buckling or breaking down of the hose at or near the coupling.

Woven or rubber hose or hose composed partly of rubber and partly of woven material is usually made up for use in sections of suitable length, and each section is attached at each end to a metallic coupling. The coupling has an elongated portion or nipple, which is extended into the hose and upon which the latter is clamped in various ways. When the hose is bent or flexed, its inner circumference on the outer side of the curve is brought into contact with the end of the nipple and is thereby frequently worn or rubbed, so that in a comparatively short time the hose will leak at such point. A short turn or bend will buckle or kink the hose near the coupling, and this tends to rapidly deteriorate the material of which the hose is made.

In my present invention I have provided a light, strong, and durable flexible guard for the hose, which effectually prevents buckling or kinking thereof, the guard being interposed between the nipple and the surrounding portion of the hose and moving more or less with the latter when it is bent or flexed, thereby obviating any engagement of the latter by the inner end of the nipple.

My invention is applicable to garden or other hose, and I have found it particularly valuable with air-brake connections wherein the short length of hose between the couplings and the rough usage to which such connections are subjected cause rapid wear and deterioration of the hose.

The various novel features of my invention will be described hereinafter in the subjoined specification and particularly pointed out in the following claims.

Figure 1 is a side elevation, partly broken out, of one embodiment of my invention illustrated as applied to an air-brake connection. Fig. 2 is an enlarged detail thereof, the hose being shown in section to illustrate the operation of my invention when the hose or tubing is bent or flexed. Fig. 3 is an enlarged detail view showing a section of hose with a different form of coupling and with my invention applied thereto, and Fig. 4 is a sectional detail, enlarged, through one of the coils of the guard.

Referring to Fig. 1, C and C' are the air-brake couplings, the former being termed the "coupling-head" and the latter the "pipe-coupling," of usual construction, the couplings having elongated nipples $c$ and $c'$, respectively, extended into the ends of the flexible hose or tubing H, of any suitable and well-known character. Herein the nipples are provided with annular shoulders or enlargements $c^x$ $c'^x$, and from the shoulders the nipples are shown as reduced somewhat in external diameter at $c^5$ $c^6$, respectively. The latter portions of the nipples have holes 5 and 6 therein near the shoulders, as shown in Fig. 1, for a purpose to be described. The ends of the hose or tubing are drawn over the nipples and rigidly secured thereto, as herein shown, by clamping-rings B and B', of any suitable construction, the clamping-rings surrounding the hose between the shoulders and the external parts of the couplings. Heretofore the hose when bent or flexed has been brought internally into engagement with the inner end of the nipple, the latter rubbing over and abrading the material of the hose and presenting an abrupt edge over which the latter was very apt to buckle or break, resulting in rapid wear and leakage thereat. In order to obviate such wear by relieving the hose from friction and to support the hose in a novel and efficient manner, so that a sharp turn or bend cannot occur, I have provided a flexible spirally-coiled metallic guard, which surrounds and is movable upon the nipple and is extended beyond it into the hose. This guard is made from a strip of spring metal, preferably steel, coiled into spiral form, as at G, of such external diameter as to easily enter the hose without stretching or expanding it, and normally the adjacent coils lie quite close to each other, as shown in Fig. 3. Preferably the strip in cross-section is substantially an elongated and rather flat ellipse, (see Fig. 4,) having truncated ends, so that the supporting-surface of each coil is slightly convexed, with no tendency to catch or pinch the material of the hose between adjacent coils when the guard is flexed. The end of the guard is slipped onto the part of the coupling-nipple between the shoulder and the inner end of the nipple and interposed between the latter and the surrounding hose, and only the extremity of the guard is attached to the nipple. A convenient and effective mode of attachment is herein shown by bending inward the free end of the spiral, as at $g^\times$, and inserting it through the hole 5 or 6 of the nipple. (See Figs. 1 and 2.) When the guard is secured to the nipple, the hose is drawn on and secured to the coupling. The free end of the guard extends a considerable distance beyond the nipple, and when the hose is bent or flexed, referring more particularly to Fig. 2, the coils of the guard move or slide freely over the nipple and open or separate at the outer side of the bend and close in at the opposite side. The coils of the guard thus to a certain extent move with and support and hold the hose away from the end of the nipple, preventing any contact and friction therewith, and they also sustain the hose in a regular curve or bend, obviating any buckling or breaking down thereof, the coils returning with the hose to normal position when the bending pressure is removed from the hose. An important feature is this movement or sliding of the coils of the guard along the nipple, for by securing the guard only at its extremity to the nipple the guard is free when flexed to slide and move over the nipple beyond the point of attachment, and particularly at the inner end of the nipple, thereby holding the hose away from the nipple and preventing said hose or tubing from getting a sharp bend or break at the inner end of the nipple.

In air-brake connections such as illustrated in Fig. 1, the hose or tubing H being made up as a short section, I prefer to extend the guard therethrough from end to end, the ends of the guard being attached to the nipples of the couplings C and C', respectively. Air-brake connections are subjected to rough handling at times, and occasionally the couplings of adjacent cars will be released without previous release of the air-brake connection, and then the latter is pulled apart. The coupling-heads may then separate automatically; but frequently the hose connection will be torn from one or the other of its couplings and destroyed. To prevent such rupture of the hose, I connect the pipe-coupling and coupling-head by a flexible non-extensible safety connection, (shown in Fig. 1 as a chain M, attached at its ends directly to the clamps B B',) the length of the connection being such that elongation of the hose-section cannot be effected by a direct pull, as by separation of the cars. The strain of such a pull is taken up by the safety connection M, and usually it will be sufficient to cause disengagement of the coöperating coupling-heads of the two air-brake connections.

In Fig. 3 I have shown a coupling D of the form frequently used in garden-hose, and the nipple $d$ is reduced in diameter at $d'$ to leave a shoulder $d^2$, the end of the guard G being slipped onto the reduced portion, while the hose is clamped onto the part $d$ of the nipple beyond the shoulder. The end $g^\times$ of the guard is attached to the nipple by inserting it into the hole 12.

In the case of garden or other hose where the sections are of considerable length it is unnecessary to extend the guard from one to the other coupling; but the guard attached to each coupling extends far enough into the hose beyond the nipple to shield or guard the hose therefrom and prevent buckling or breaking down adjacent the coupling, this moving of the coils with the hose preventing any friction between the latter and the nipple, as has been described.

My invention is not restricted to the precise construction and arrangement herein shown and described, as the same may be modified in various details without departing from the spirit and scope of my invention.

Having fully described my invention, what I claim as new, and desire to secure by Letters Patent, is—

1. The combination with a flexible hose, and an attached coupling having a nipple extended into the hose, of a flexible, spirally-coiled guard internally concentric with the hose and interposed between the latter and the nipple of the coupling, the guard being positively attached at its extremity only to the nipple and movable thereover beyond such point of attachment.

2. The combination with a flexible hose, and an attached coupling having a nipple extended into the hose, of a flexible, spirally-coiled guard secured at its extremity only to the nipple and freely movable longitudinally between it and the surrounding portion of the hose and extended into the latter a distance beyond the end of the nipple.

3. The combination with a flexible hose, and an attached coupling having a nipple extended into the end of the hose and provided with a shoulder over which the hose is stretched, of a spirally-coiled flexible guard loosely embracing and secured at its extremity only to the nipple beyond and adjacent the shoulder and interposed between the nipple and the surrounding portion of the hose, the free end of the guard projecting into the latter a distance beyond the nipple, the portion of the guard surrounding the nipple being freely movable thereover beyond the point of attachment.

4. The combination with a flexible hose or tube, and an attached coupling, of an elongated flexible and spirally-coiled metallic guard secured to the coupling within the hose or tubing and extending into the latter, the coils presenting in cross-section elongated, flattened ellipses to form broad and slightly-convex supporting-surfaces for the hose when bent or flexed.

5. The combination with a flexible hose, and an attached coupling having a nipple extended thereinto and reduced in external diameter at its inner end, of a flexible guard consisting of an open, spirally-coiled strip of metal surrounding the reduced end only of the nipple between it and the inclosing hose, the end of the spiral being secured positively to the nipple while the free end of the spiral extends beyond the nipple into the hose, the coils of the spiral beyond its point of attachment moving over the nipple with and preventing engagement of the interior of the hose by the inner end of the nipple when the hose is bent or flexed.

6. The combination in an air-brake connection of the hose, a coupling at and secured to each end thereof each coupling having a nipple extended into the end of the hose, and a flexible, spirally-coiled guard interposed at its ends between the nipples and the inclosing portion of the hose and attached at its extremities to the nipples, said coiled guard being free to move along the nipples between its attached extremities and the inner ends of the nipples.

7. The combination in an air-brake connection of the hose, an attached air-brake coupling secured to each end of the hose and having a shouldered nipple extended into the latter, and a flexible, open and spirally-coiled metallic guard extended through the hose from one coupling to the other and embracing and being free to move upon the nipple of each below its shoulder, the extremities of the guard being positively secured to the nipples adjacent their shoulders.

8. The combination in an air-brake connection of the hose, an attached air-brake coupling secured to each end of the hose and having a nipple extended into the latter, of a flexible, spirally-coiled metallic guard interposed at one end between each nipple and the surrounding hose and attached at its extremity only to the nipple, the guard being movable upon and extending beyond the latter into and in contact with the inner circumference of the hose.

In testimony whereof I have signed my name to this specification in the presence of two subscribing witnesses.

FRANK M. MARCY.

Witnesses:
  E. D. BANCROFT,
  ERNEST W. WOOD.